United States Patent
Wang et al.

(10) Patent No.: US 8,670,260 B2
(45) Date of Patent: Mar. 11, 2014

(54) MULTIPLE INVERTER AND ACTIVE POWER FILTER SYSTEM

(75) Inventors: Bin Wang, Shanghai (CN); Hongyang Wu, Shanghai (CN); Jian Jiang, Shanghai (CN); Jingtao Tan, Shanghai (CN); Yaping Yang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 19 days.

(21) Appl. No.: 13/615,932

(22) Filed: Sep. 14, 2012

(65) Prior Publication Data
US 2013/0229836 A1 Sep. 5, 2013

(30) Foreign Application Priority Data
Mar. 2, 2012 (CN) .......................... 2012 1 0053891

(51) Int. Cl.
*H02M 7/537* (2006.01)
*H02M 7/155* (2006.01)

(52) U.S. Cl.
USPC ................. 363/131; 363/17; 363/39; 363/40; 363/41; 363/95; 363/98; 363/132

(58) Field of Classification Search
USPC .............. 363/17, 39, 40, 41, 95, 98, 131, 132
See application file for complete search history.

(56) References Cited

U.S. PATENT DOCUMENTS

| | | | | |
|---|---|---|---|---|
| 5,905,642 A * | 5/1999 | Hammond | ...................... | 363/37 |
| 6,690,592 B2 * | 2/2004 | Link | ............................... | 363/98 |
| 6,794,929 B2 * | 9/2004 | Pelly | ............................... | 327/552 |
| 6,850,424 B2 * | 2/2005 | Baudelot et al. | ................ | 363/37 |
| 6,995,992 B2 * | 2/2006 | Wei et al. | ........................ | 363/34 |
| 7,187,229 B2 * | 3/2007 | Pelly | ............................... | 327/551 |
| 7,190,143 B2 * | 3/2007 | Wei et al. | ...................... | 318/606 |
| 7,385,438 B2 * | 6/2008 | Pelly | ............................... | 327/551 |
| 8,310,848 B2 * | 11/2012 | Sakakibara | ..................... | 363/37 |
| 2002/0172063 A1* | 11/2002 | Link | ............................... | 363/132 |
| 2007/0030706 A1* | 2/2007 | Wei et al. | ........................ | 363/44 |
| 2008/0180164 A1* | 7/2008 | Pelly | ............................... | 327/552 |
| 2009/0140577 A1* | 6/2009 | Fishman | ......................... | 307/82 |
| 2011/0299311 A1* | 12/2011 | Zhu et al. | ...................... | 363/132 |

* cited by examiner

*Primary Examiner* — Bao Q Vu
(74) *Attorney, Agent, or Firm* — Morris Manning & Martin LLP; Tim Tingkang Xia, Esq.

(57) ABSTRACT

A multiple inverter and an active power filter system are disclosed in the invention, said multiple inverter can decrease the volume and harmonics, increase the efficiency and decrease the cost, and can be applied to various occasions. The technical scheme is: the filter assembly in the multiple inverter is installed at the output inductor of the multiple inverter for filtering the harmonics.

19 Claims, 7 Drawing Sheets

MULTIPLE INVERTER AND ACTIVE POWER FILTER SYSTEM

CROSS-REFERENCE TO RELATED APPLICATION

This non-provisional application claims priority under 35 U.S.C. §119(a) on Patent Application No. 201210053891.8 filed in P.R. China on Mar. 2, 2012, the entire contents of which are hereby incorporated by reference.

FIELD OF THE INVENTION

The invention relates to an inverter structure, and more particularly to a multiple inverter and an active power filter system.

BACKGROUND OF THE INVENTION

With the rapid development of the power electronic technology, makes the application of the power electronic devices to be are used more and more widely. Wherein, the inverter is used widely in the application occasions power system, such as uninterruptible power supply (UPS), active power filter (APF), static var generator (SVG), and the like. In the art, various attempts and efforts have been made aiming at improving the respective specifications, such as decreasing the volume of the inverter, improving the efficiency of the inverter, reducing the cost of the inverter, decreasing eliminating the output harmonics of the inverter, the compatibility of three-phase-three-wire and three-phase-four-wire, and the like. However, various circuit topologies have their respective limitations, for example, the application condition of the respective prior circuit topology has its own respective limitations, and the respective problems cannot be solved excellently.

For example, some of the prior inverter topologies are shown mainly in FIG. 1 and FIG. 2. FIG. 1 shows a two-level inverter, and FIG. 2 shows a three-level inverter. In the prior art, IGBT having higher voltage must be selected for two-level inverter, while the efficiency and the switching frequency may be rather low. In order to reduce filter the switching ripple, larger filter must be designed, meantime, the loss is large. The three-level inverter can decrease the harmonic output and the volume to a certain extent, however, the harmonic output is still large, and deficiencies exist in the compatibility of the three-phase-three-wire and three-phase-four-wire.

In order to avoid the drawbacks which are mentioned above, a new design of inverter and its application system are the target desired to be accomplished by the industry.

SUMMARY OF THE INVENTION

An object of the invention is to provide a multiple inverter in order to solve one of the above problems, such as decreasing the volume and harmonics, increasing the efficiency and reducing the cost and being applied to various application conditions.

Another object of the invention is to provide an active power filter system in which the above multiple inverter is installed internally in order to decrease the volume and harmonics, increase the efficiency or reduce the cost.

One technical scheme of the invention is: a multiple inverter is disclosed here, said multiple inverter comprises:

at least two inverter units, wherein each inverter unit comprises:

a three-phase inverter bridge including a plurality of switching devices;

an inverter unit output inductor module comprising a first phase inverter unit output inductor module, a second phase inverter unit output inductor module, and a third phase inverter unit output inductor module, wherein each phase inverter unit output inductor module comprises at least one inductor, one terminal of the first phase, the second phase, and the third phase inverter unit output inductor module is coupled correspondingly to the first phase, the second phase, and the third phase of the three-phase inverter bridge, respectively;

three coupling points, another terminals of the first phase inverter unit output inductor modules of all the inverter units are coupled together to form the first coupling point, another terminals of the second phase inverter unit output inductor modules of all the inverter units are coupled together to form the second coupling point, and another terminals of the third phase inverter unit output inductor modules of all the inverter units are coupled together to form the third coupling point;

a multiple inverter output inductor module comprising a first phase multiple inverter output inductor module, a second phase multiple inverter output inductor module, and a third phase multiple inverter output inductor module, each phase multiple inverter output inductor module comprises at least one inductor, one terminal of the first phase, the second phase, and the third phase multiple inverter output inductor module is coupled correspondingly to the first, the second and the third coupling point, respectively, another terminal of the first phase, the second phase and the third phase multiple inverter output inductor module is the first phase, the second phase and the third phase output of said multiple inverter, respectively; and three groups of filter assemblies, comprising a first group of filter assembly, a second group of filter assembly, and a third group of filter assembly, each group of filter assembly at least comprises one capacitor, the first group, the second group and the third group of filter assembly are coupled correspondingly to the first, the second, and the third coupling points, respectively.

According to an embodiment of the multiple inverter, each group of filter assembly comprises at least two capacitors connected in parallel and/or in series.

According to an embodiment of the multiple inverter, each group of filter assembly comprises damping filter including capacitors and resistors.

According to an embodiment of the multiple inverter, each group of filter assembly comprises notch filter including capacitors and inductors.

According to an embodiment of the multiple inverter, each group of filter assembly comprises notch filter composed of including capacitors and inductors and damping filter composed of including capacitors and resistors, wherein said notch filter and damping filter are connected in parallel.

According to an embodiment of the multiple inverter, said multiple inverter further comprising:

at least two current detectors, wherein each inverter unit comprises one current detector, the current detector and the inverter unit output inductor module of said inverter unit are connected in series for sampling the output current of said inverter unit; and a control circuit, comprising:

at least two controllers, wherein one input terminal of each controller is correspondingly connected with output terminal of each current detector to receive the current value from said current detector, another input terminal of said controller receives a set reference signal and based on the set reference signal and the current value received from the current detector output duty cycle signals; and at least two drive signal generators, wherein input terminals of each drive signal generator receives the duty cycle signal outputted by said controller, and a modulated carrier signal, and output a drive signal to control the corresponding inverter unit.

According to an embodiment of the multiple inverter, the drive signals of the inverter units shift by preset value between each other According to an embodiment of the multiple inverter, inverter unit is two-level inverter units.

According to an embodiment of the multiple inverter, said inverter unit is three-level inverter unit.

According to an embodiment of the multiple inverter, said three-level inverter unit is a three-level flying capacitor inverter unit or a three-level neutral point clamped inverter unit. An active power filter system is also disclosed in the invention, said active power filter system comprises:

a harmonic detection and extraction circuit, a non-linear load current of said active power filter system is detected by said harmonic detection and extraction circuit; and a multiple inverter, wherein the harmonics and the reactive current components outputted by said harmonic detection and extraction circuit is the set reference signal of the control circuit of the multiple inverter.

According to an embodiment of the active power filter system, each group of filter assembly of said multiple inverter comprises at least two capacitors connected in parallel and/or in series.

According to an embodiment of the active power filter system, each group of filter assembly of said multiple inverter comprises damping filter including capacitors and resistors.

According to an embodiment of the active power filter system, each group of filter assembly of said multiple inverter comprises notch filter including capacitors and inductors.

According to an embodiment of the active power filter system, each group of filter assembly of said multiple inverter comprises notch filter including capacitors and inductors, damping filter composed of capacitors and resistors, wherein said notch filter and said damping filter are connected in parallel.

According to an embodiment of the active power filter system, the drive signals of the switching devices of each of the inverter units of said at least two inverter units have a certain angle difference with each other.

According to an embodiment of the active power filter system, said at least two inverter units are two-level inverter units.

According to an embodiment of the active power filter system, said at least two inverter units are three-level inverter units.

According to an embodiment of the active power filter system, said three-level inverter unit is a three-level flying capacitor inverter unit or a three-level neutral point clamped inverter unit.

Comparing the invention with the prior art, one of the following benefits is obvious: multiple inverter the scheme of the invention is to installed filter assembly at the output inductor of the multiple inverter has less harmonics or more wide application.

DETAILED DESCRIPTION OF THE INVENTION

The drawings accompanied by the following description illustrate some embodiments of the present invention and help to understand the present invention.

Figure 1:
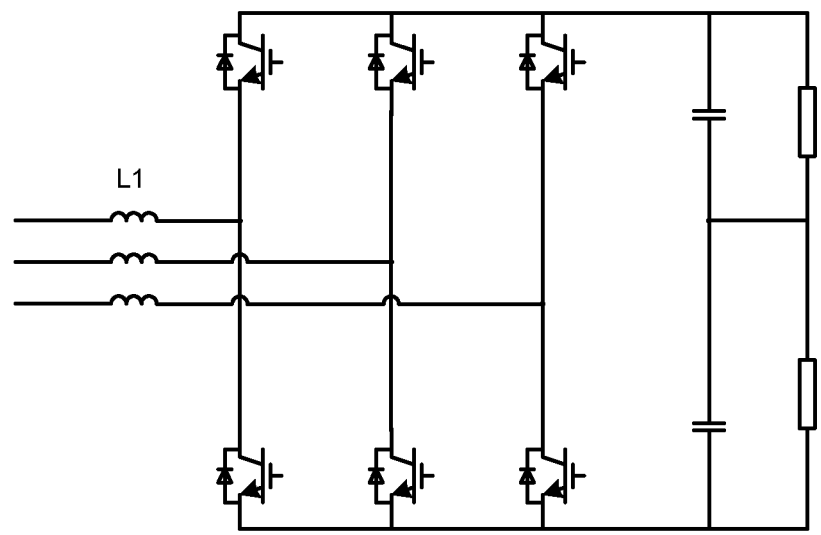
FIG. 1 shows a structure of a prior two-level inverter.
Figure 2:
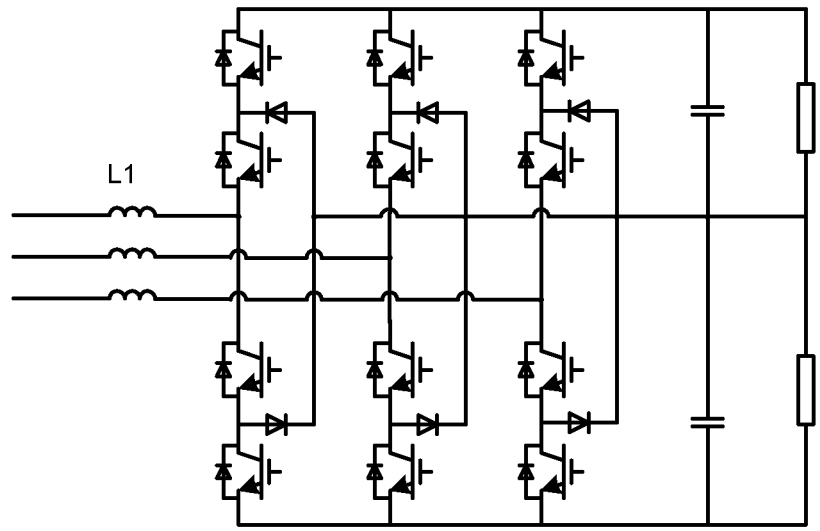
FIG. 2 shows a structure of a prior three-level inverter.
Figure 3:
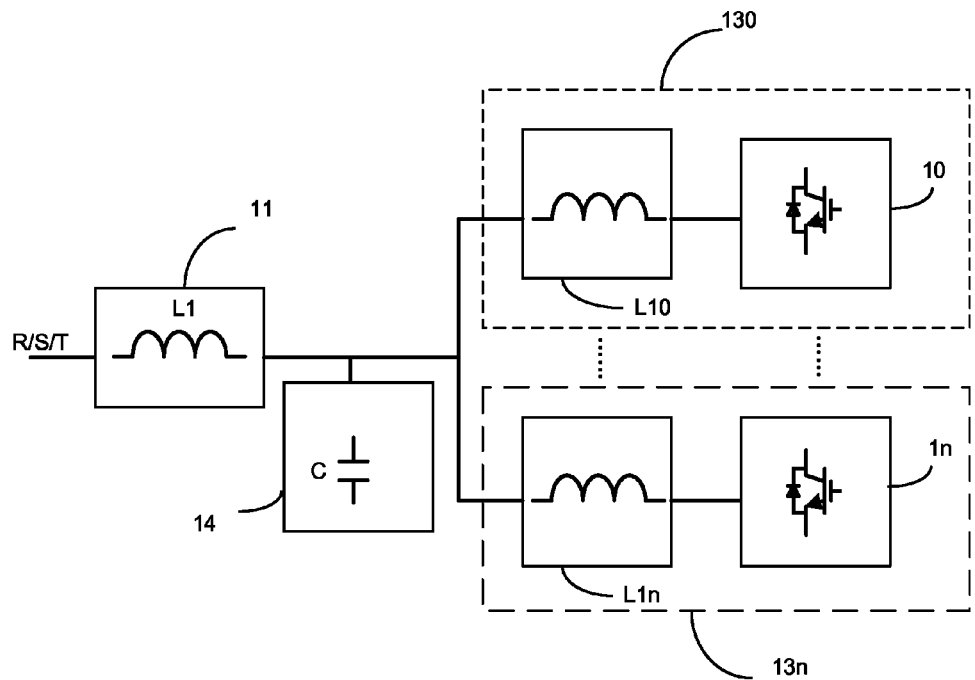
FIG. 3 shows a simple schematic diagram of a structure of a multiple inverter with filter assembly in the invention.

FIG. 3 shows a simple schematic diagram of a structure of a multiple inverter with filter assembly. The modulated carrier signals of n N inverters are connected in parallel and their modulated carrier signals have a difference of shift by 360/n degrees with between each other, that is, it is the connection structure of the multiple inverter. As shown in FIG. 3, the multiple inverter comprises: at least two inverter units $130$~$13n$, three coupling points, a multiple inverter output inductor module 11, a filter assembly 14. Taking the inverter unit 130 as an example, the inverter unit 130 at least comprises a three-phase inverter bridge 10 including a plurality of switching devices (a switching device is any device which can be controlled to switch on and/or switch off, for example, MOSFET, IGBT, and the like), and an inverter unit output inductor module L10. The inverter unit output inductor module L10 comprises a first phase inverter unit output inductor module, a second phase inverter unit output inductor module, and a third phase inverter unit output inductor module, wherein each phase inverter unit output inductor module comprises at least one inductor. One terminal of the first phase inverter unit output inductor module, the second phase inverter unit output inductor module, the third phase inverter unit output inductor module is coupled correspondingly to the first phase, the second phase and the third phase of the three-phase inverter bridge 10, respectively. Similarly, the inverter unit $13n$ has the same circuit structure, the inverter unit output inductor module $L1n$ comprises a first phase inverter unit output inductor module, a second phase inverter unit output inductor module, and a third phase inverter unit output inductor module, wherein each phase inverter unit output inductor module comprises at least one inductor. One terminal of the first phase inverter unit output inductor module, the second phase inverter unit output inductor module, the third phase inverter unit output inductor module is coupled correspondingly to the first phase, the second phase and the third phase of the three-phase inverter bridge $1n$, respectively. For three coupling points in the multiple inverter, another terminals of all the first phase inverter unit output inductor modules of inverter units $130$~$13n$ are coupled together to form the first coupling point, another terminals of all the second phase inverter unit output inductor modules of inverter units 130~13n are coupled together to form the second coupling point, and another terminals of all the third phase inverter unit output inductor modules of each inverter units 130~13n are coupled together to form the third coupling point. The multiple inverter output inductor module 11 comprises a first phase multiple inverter output inductor module, a second phase multiple inverter output inductor module, and a third phase multiple inverter output inductor module. Each phase multiple inverter output inductor module comprises at least one inductor. One terminal of the first phase, the second phase, and the third phase multiple inverter output inductor module is coupled correspondingly to the first, the second, and the third coupling point, respectively, and another terminal of the first phase, the second phase, and the third phase multiple inverter output inductor module is the first phase, the second phase, and the third phase output of the multiple inverter, respectively.

The filter assembly 14 comprises a first group of filter assembly, a second group of filter assembly, and a third group of filter assembly. Each group of filter assembly at least comprises one capacitor, and is coupled correspondingly to the first, the second, and the third coupling point, respectively. In an embodiment, the inverter unit 130~13n in FIG. 3 can be two-level inverter, or three-level inverter. Each group of filter assembly in filter assembly 14 of FIG. 3 at least comprises one capacitor. A LCL filter is formed by said capacitor and the inductor in the multiple inverter output inductor module and the inductor in the inverter unit output inductor module together for filtering the output harmonics of the multiple inverter. However, each filter assembly can be a single capacitor or at least two capacitors connected in series and/or in parallel. Of course, Apart from using the capacitor shown in FIG. 3 as the filter assembly, other filters, for example, a damping filter formed by capacitors and resistors, or a notch filter formed by capacitors and inductors can be used as filter assembly.

Figure 4:
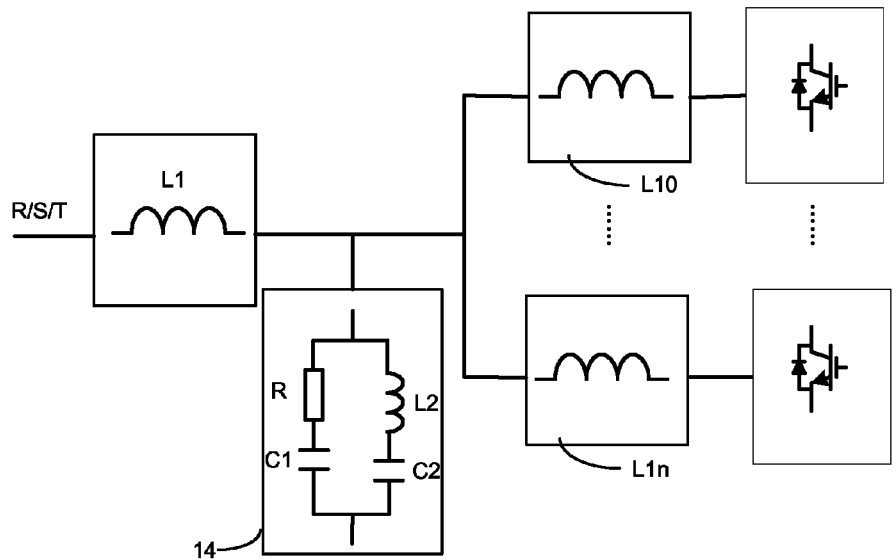
FIG. 4 shows a simple schematic diagram of a structure of multiple inverter with LCL filter having notch filter in the invention.

Preferably, apart from the form of the above damping filter, it can also be a filter assembly having both notch filter and damping filter structure as shown in FIG. 4. Wherein the notch filter structure is a structure of capacitor C2 and inductor L2 connected in series as shown in FIG. 4, the damping filter structure is a structure of resistor R and capacitor C1 connected in series as shown in FIG. 4, the notch filter and the damping filter can be connected in parallel. The filter assembly combined with the inductor of the multiple inverter output inductor module and the inductor of the inverter unit output inductor module form a LCL filter.

Figure 5:
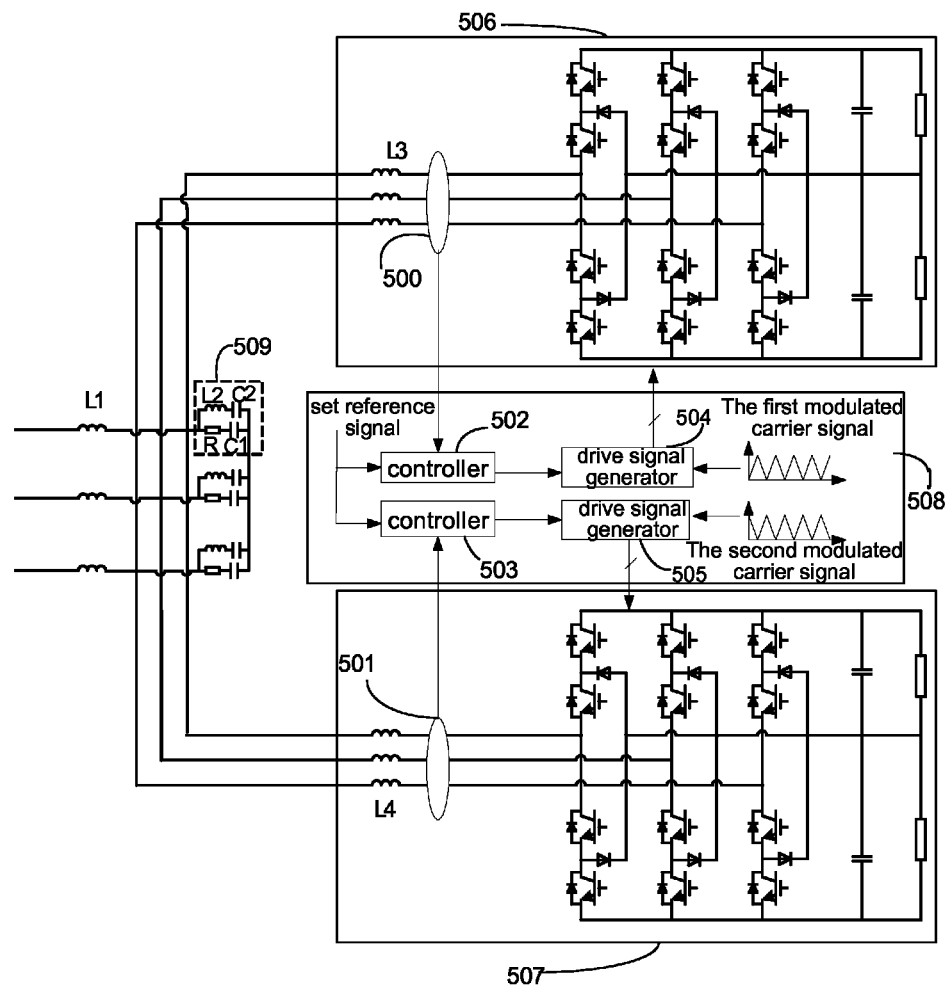
FIG. 5 shows a circuit diagram of a structure of a three-level inverter with LCL filter having notch filter in the invention.

The invention will be described by taking a multiple inverter formed by two inverters and their modulated carrier signals shifted by 180 degrees between each other as an example. FIG. 5 shows a circuit diagram of a structure of a three-level inverter having LCL filter with notch filter in the invention. In FIG. 5, the multiple three-level inverter comprises a first three-level inverter unit 506, and a second three-level inverter unit 507. Each three-level inverter unit comprises a inverter unit output inductor module L3 or L4. One terminal of each phase of the inverter unit output inductor module is correspondingly connected to one phase of inverter bridge, and another terminals of all the same phase of the inverter unit output inductor modules are connected together to form a coupling point. For three phase inverter unit output module, there are three coupling points. As shown in FIG. 5, the multiple three-level inverter further comprises a multiple inverter output inductor module L1. One terminal of each phase of multiple inverter output inductor module L1 is corresponding connected with one coupling point, another terminals of three phase of the multiple inverter output inductor module L1 are used as three phase output of the multiple three-level inverter.

The operation principle of the filter assembly will be described as follows by taking one phase of the multiple three-level inverter as an example. In FIG. 5, the first filter assembly 509 in the filter assembly comprises a notch filter including an inductor L2 and a capacitor C2 and a damping filter including a resistor R and a capacitor C1, wherein the notch filter and the damping filter are connected in parallel. The first filter assembly 509 is connected with one of the three coupling point. One inductor in the multiple inverter output inductor module L1, one inductor in the inverter unit output inductor module L3 and L4 that connected with the right coupling point that connected with the first filter assembly 509 combined with the first filter assembly 509 could form a LCL filter. The other two phase of the multiple three-level inverter also have its own corresponding LCL filter, it will not be further described here anymore due to the same principle.

In FIG. 5, the multiple three-level inverter further comprises current detectors 500, 501, and control circuit 508, the control circuit 508 is including controllers 502, 503 and drive signal generators 504, 505. Wherein the current detector 500 and the inverter unit output inductor module L3 of the first three-level inverter unit 506 are connected in series, the current detector 501 and the inverter unit output inductor module L4 of the second three-level inverter unit 507 are connected in series. The function of the current detectors 500, 501 is to sample the output current of the corresponding three-level inverter unit.

The input of the controller 502 is connected to the output of the current detector 500, and the input of the controller 503 is connected to the output of the current detector 501. The function of the controller 502 is to receive the current values from the current detectors 500 and to output duty cycle signal (a first duty cycle signal) of corresponding inverter unit by incorporating set reference signal, and to deliver said first duty cycle signal to the drive signal generator 504. The function of the controller 503 is the same as the controller 502. The difference is that the corresponding current detector is 501 and the deliver a second duty cycle signal to the drive signal generator 505.

The input of the drive signal generator 504 is connected to the output of the controller 502 to receive the first duty cycle signal outputted by the controller 502, and to receive the first modulated carrier signal, the input of the drive signal generator 505 is connected to the output of the controller 503 to receive the second duty cycle signal outputted by the controller 503, and to receive the second modulated carrier signal. The function of the drive signal generators 504, 505 is to compare, respectively, the first duty cycle signal and the second duty cycle signal with the first modulated carrier signal and the second modulated carrier signal, and to obtain the drive signals of the corresponding inverter units: a first drive signal and a second drive signal. The first drive signal and the second drive signal are applied to drive the first three-level inverter unit 506 and the second three-level inverter unit 507 respectively.

Figure 6:
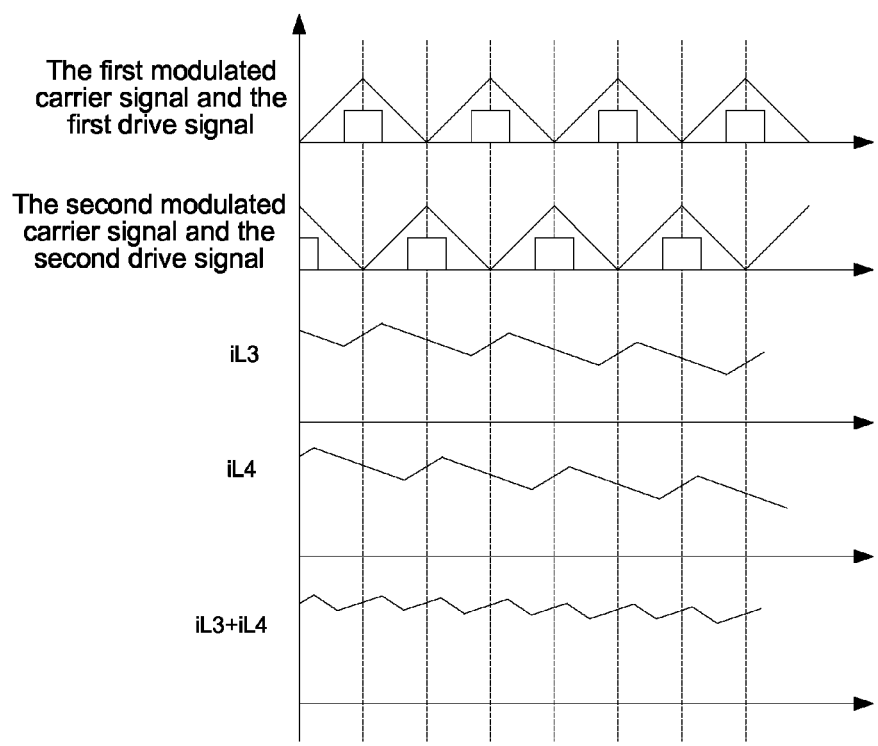
FIG. 6 shows a schematic diagram of output current analysis of a multiple three-level inverter of FIG. 5.

In the above structure, the first modulated carrier signal and the second modulated carrier signal corresponding to two three-level inverter unit, respectively, shift by 180 degrees between each other, as shown in FIG. 6. Due to shift between the first modulated carrier signal and the second modulated carrier signal, the first drive signal and the second drive signal of two three-level inverter units also shift by 180 degrees between each other. As the square wave shown in FIG. 6. Of course, for a multiple inverter having n three-level inverter units, the drive signals of inverter units shift by 360 degrees/n between each other. Then, correspondingly, the current wave iL3 and iL4 outputted by each phase inverter unit of two three-level inverter units also shift by 180 degrees with each other, as shown in FIG. 6. The output currents iL3, iL4 shifted by 180 degrees between each other will converge at the connection point of the inverter unit output inductor modules of two three-level inverter units. Then, the ripple currents will be canceled on the total current, as iL3+iL4 shown in the drawing. That is, the harmonic of switching frequency has been diminished. For example, if the switching frequency of a single inverter unit is 30 KHz, then the current waveform will only present the waveform of 60 KHz frequency and above.

In FIG. 5, after the currents of two three-level inverter units are converged, through the notch filter including the inductor L2 and the capacitor C2 and the damping filter including the resistor R and the capacitor C1, and it is further outputted by the inductor in the multiple inverter output inductor module L1. Of course, the filter assembly can further comprises other filter devices, such as capacitor, damping capacitor including capacitors and resistors, or other more complicated high frequency filter structure (for example, several capacitors are further connected in parallel with the capacitor or damping capacitor).

Figure 7:
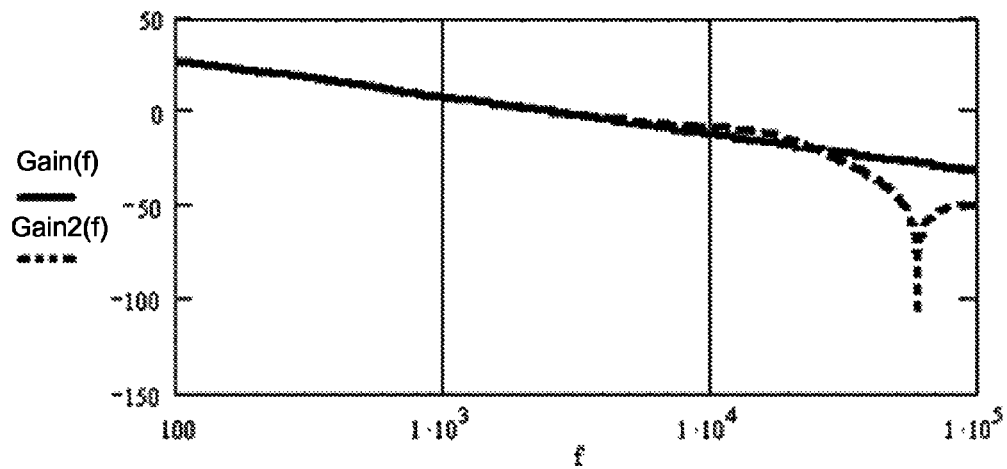
FIG. 7 shows a schematic diagram of frequency characteristic of LCL filter having notch filter.

Compared the LCL filter shown in FIG. 5 with single inductor, the baud chart shown in FIG. 7 shows their difference. Gain2 in FIG. 7 represents the LCL filter and Gain represents the single inductor. As Shown in FIG. 7, the LCL filter and single inductor has almost the same characteristic within the low frequency band. But during the high frequency band, the Gain2 has a sharp turn down and back up again and trend down more quickly than the Gain does within the high frequency band. That the Gain2 trend down quickly is mainly caused by the damp filter in the filter assembly of the LCL filter, and the sharp turn down of Gain2 causes by the notch filter in filter assembly of the LCL filter. If the LCL applied in the multiple inverter operated on switching frequency of 30 KHz, the sharp turn down may occur at a frequency near 60 KHz (may be an error of 15%), by the parameter design of the LCL filter.

Because the current outputted by two inverter units after converging only contains the harmonic of doubled switching frequency and above, so according to the characteristic of the filter assembly, the notch filter is only designed at a frequency near the doubled switching frequency (involving an error of 15%), the RC damping filter is only designed to filter the harmonic of higher frequencies, in this way, the difficulty or the volume of the filter design can be reduced significantly, while the filtering effect can be improved.

Figure 8:
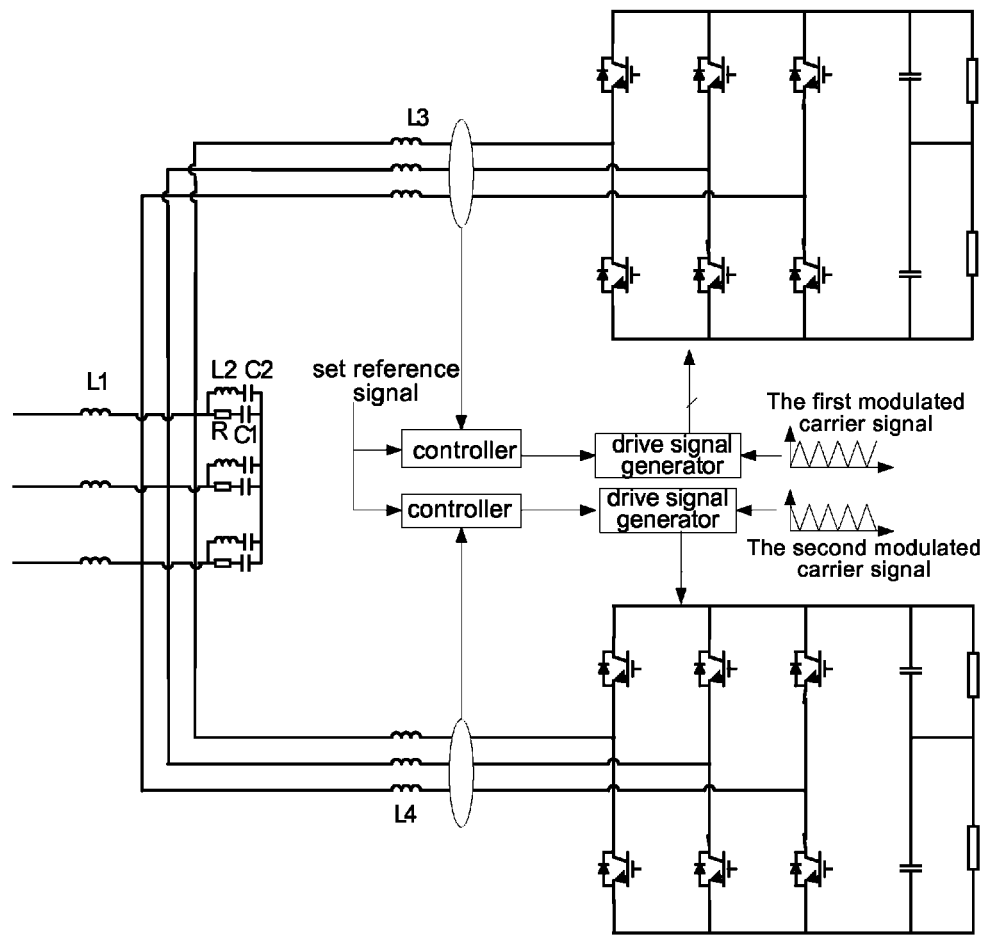
FIG. 8 shows a circuit diagram of a structure of a multiple two-level inverter with LCL filter having notch filter in the invention.

FIG. 5 shows a structure of multiple three-level inverter, apart from this, there are many variant versions, for example, a multiple two-level inverter structure as shown in FIG. 8, by comparing it with FIG. 5, only the structures of the inverter units are different, however, the filter assembly having notch filters and damping filters and the control circuits are the same as those in FIG. 5, and it will not be repeated herein.

Figure 9:
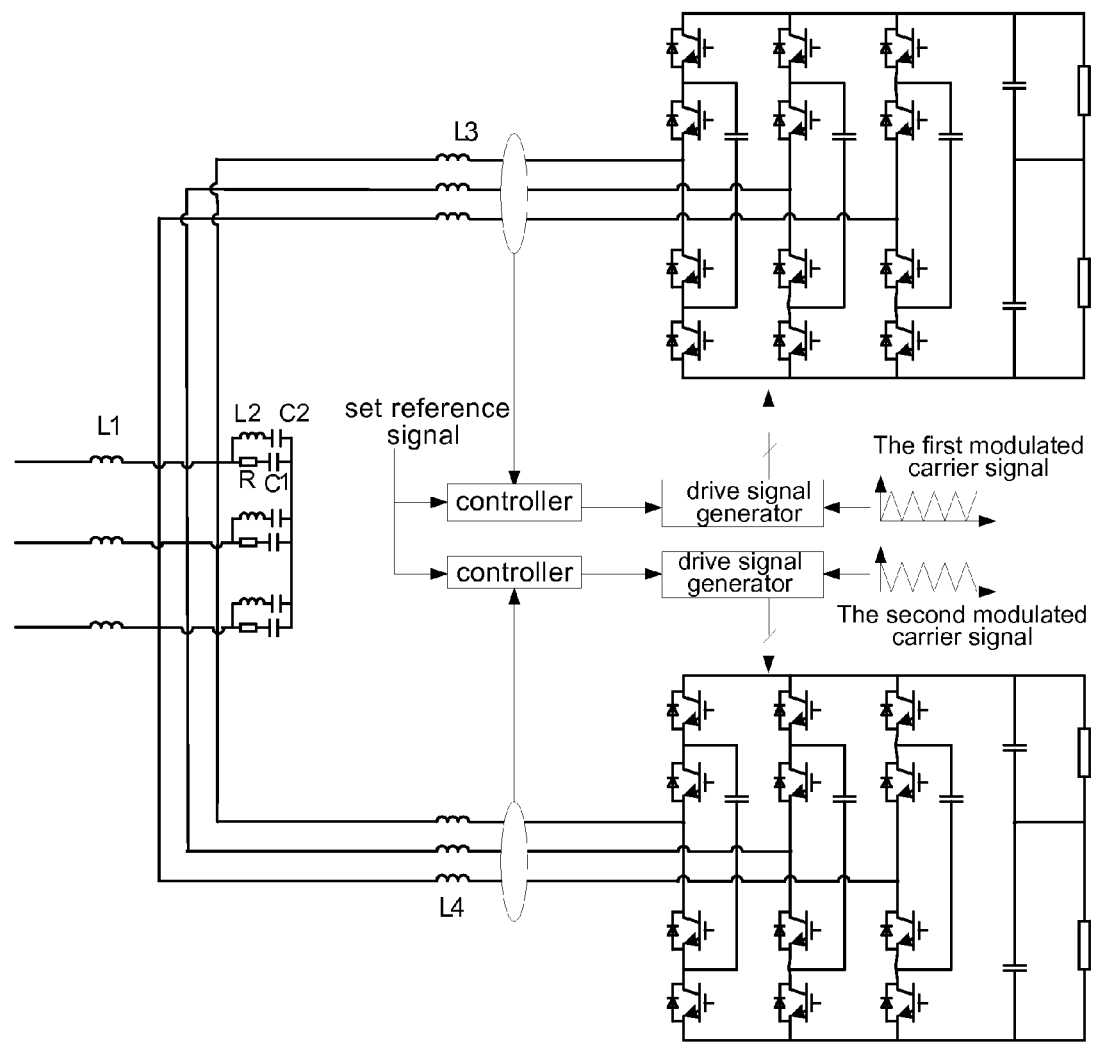
FIG. 9 shows a circuit diagram of a structure of a multiple three-level flying capacitor inverter with LCL filter having notch filter in the invention.

FIG. 9 shows a structure of a multiple three-level flying capacitor inverter. By comparing it with FIG. 5, only the structure of the inverter units are different, however, the filter assembly having notch filters and damping filters and the control circuits are the same as those in FIG. 5, and it will not be repeated herein.

The filter assembly comprising the notch filter and the damping filter and the control circuit are independent. Therefore, in the structures of FIG. 5, FIG. 8 and FIG. 9, the filter assembly or the control circuit can use different configuration not limited to example shown in the figures.

Figure 10:
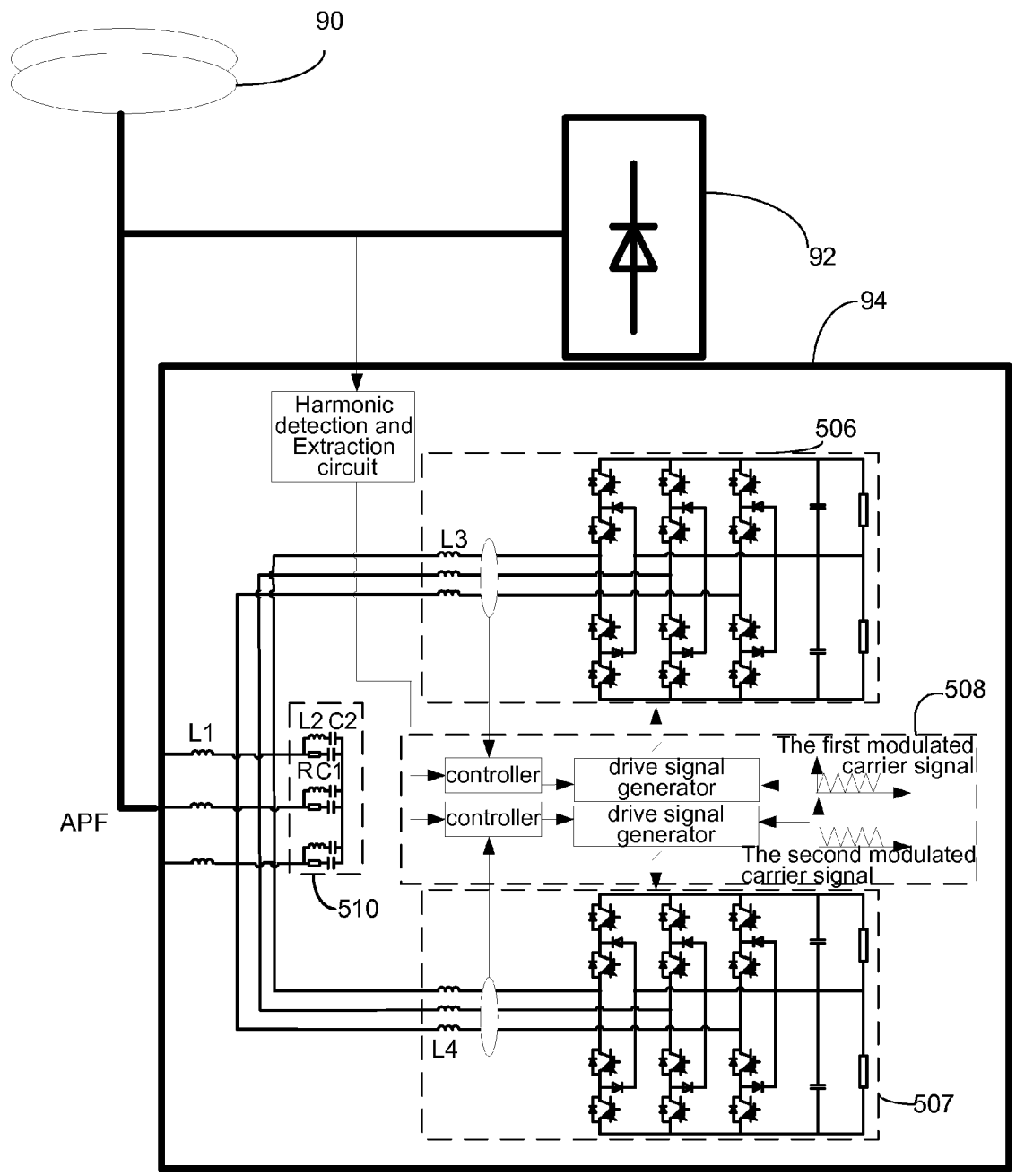
FIG. 10 shows a schematic diagram of a multiple inverter applied in the active power filter system in the invention.

The above multiple inverters can be applied in various occasions. FIG. 10 shows an active power filter system employed multiple inverter therein, and it will be described by taking the multiple three-level inverter structure in FIG. 5 as an example. The multiple inverter structures as shown in FIG. 8 and FIG. 9 (or multiple inverter structures of other forms) can also be applied in the active power filter system.

In FIG. 10, an active power filter system 94 connected at a grid node 90 comprises a harmonic detection and extraction circuit and a multiple three-level inverter, and the structure of the multiple three-level inverter is shown in FIG. 5, the description of the specific structure has been described in detail above, and it will not be repeated herein. The current of a non-linear load 92 (for example, a rectifier diode) is detected by the harmonic detection and extraction circuit, the harmonic and reactive current components therein are detected, and are set as a reference signal of the control circuit 508 of the multiple inverter, the output current of the inverter units 506 and 507 is controlled by the control circuit 508 based on the set reference signal, the output current of the first three-level inverter unit and the output current of the second three-level inverter unit. Because the shift between two carrier waves of the two inverter units is 180 degrees, the switching frequency harmonics of the output currents of two inverter units 506 and 507 can be diminished by each other. Then, through the filter assembly 510 having the notch filter and the damping filter, the harmonic near doubled switching frequency will be diminished (may be having an error of 15%), and higher switching frequency harmonics can be suppressed.

It can be understood by those skilled in the art that the inverter is not limited by the three-level inverter, and also not limited by the three-level neutral point clamped inverter, which is described in the drawing that it is embedded to the midpoint of the bus voltage by using diode, it can also be a two-level inverter as shown in FIG. 8 and a three-level flying capacitor inverter as shown in FIG. 9. The above embodiments are provided to allow those skilled in the ordinary technology of the art to realize and use the invention, various modifications and changes of the above embodiments can be made by those skilled in the ordinary technology of the art without departing the inventive idea, therefore, the scope is not limited by the above embodiments, however, it will conform to the largest scope of the inventive characteristics mentioned in the Claims.

What is claimed is:

1. A multiple inverter, wherein said multiple inverter comprises:
    at least two inverter units, wherein each inverter unit comprises:
        a three-phase inverter bridge including a plurality of switching devices;
        an inverter unit output inductor module comprising a first phase inverter unit output inductor module, a second phase inverter unit output inductor module, and a third phase inverter unit output inductor module, wherein each phase inverter unit output inductor module comprises at least one inductor, one terminal of the first phase, the second phase, and the third phase inverter unit output inductor module is coupled correspondingly to the first phase, the second phase, and the third phase of the three-phase inverter bridge, respectively;
    three coupling points, another terminals of the first phase inverter unit output inductor modules of all the inverter units are coupled together to form the first coupling point, another terminals of the second phase inverter unit output inductor modules of all the inverter units are coupled together to form the second coupling point, and another terminals of the third phase inverter unit output inductor modules of all the inverter units are coupled together to form the third coupling point;

a multiple inverter output inductor module comprising a first phase multiple inverter output inductor module, a second phase multiple inverter output inductor module, and a third phase multiple inverter output inductor module, each phase multiple inverter output inductor module comprises at least one inductor, one terminal of the first phase, the second phase, and the third phase multiple inverter output inductor module is coupled correspondingly to the first, the second and the third coupling point, respectively, another terminal of the first phase, the second phase and the third phase multiple inverter output inductor module is the first phase, the second phase and the third phase output of said multiple inverter, respectively; and three groups of filter assemblies, comprising a first group of filter assembly, a second group of filter assembly, and a third group of filter assembly, each group of filter assembly at least comprises one capacitor, the first group, the second group and the third group of filter assembly are coupled correspondingly to the first, the second, and the third coupling points, respectively.

2. The multiple inverter according to claim 1, wherein each group of filter assembly comprises at least two capacitors connected in parallel and/or in series.

3. The multiple inverter according to claim 1, wherein each group of filter assembly comprises damping filter including capacitors and resistors.

4. The multiple inverter as claim 1, wherein each group of filter assembly comprises notch filter including capacitors and inductors.

5. The multiple inverter according to claim 1, wherein each group of filter assembly comprises notch filter including capacitors and inductors and damping filter including capacitors and resistors, wherein said notch filter and damping filter are connected in parallel.

6. The multiple inverter according to claim 1, wherein said multiple inverter further comprising:

at least two current detectors, wherein each inverter unit comprises one current detector, the current detector and the inverter unit output inductor module of said inverter unit are connected in series for sampling the output current of said inverter unit; and a control circuit, comprising:

at least two controllers, wherein one input terminal of each controller is correspondingly connected with output terminal of each current detector to receive the current value from said current detector, another input terminal of said controller receives a set reference signal and based on the set reference signal and the current value received from the current detector output duty cycle signals; and at least two drive signal generators, wherein input terminals of each drive signal generator receives the duty cycle signal outputted by said controller, and a modulated carrier signal, and output a drive signal to control the corresponding inverter unit.

7. The multiple inverter as claim 6, wherein the drive signals of the inverter units shift by preset value between each other.

8. The multiple inverter as claim 1, wherein said inverter unit is two-level inverter units.

9. The multiple inverter as claim 1, wherein said inverter unit is three-level inverter unit.

10. The multiple inverter as claim 9, wherein said three-level inverter unit is a three-level flying capacitor inverter unit or a three-level neutral point clamped inverter unit.

11. An active power filter system, wherein said active power filter system comprises:

a harmonic detection and extraction circuit, a non-linear load current of said active power filter system is detected by said harmonic detection and extraction circuit; and a multiple inverter according to claim 6, wherein the harmonics and the reactive current components outputted by said harmonic detection and extraction circuit is the set reference signal of the control circuit of the multiple inverter according to claim 6.

12. The active power filter system according to claim 11, wherein each group of filter assembly of said multiple inverter comprises at least two capacitors connected in parallel and/or in series.

13. The active power filter system according to claim 11, wherein each group of filter assembly of said multiple inverter comprises damping filter including capacitors and resistors.

14. The active power filter system according to claim 11, wherein each group of filter assembly of said multiple inverter comprises notch filter including capacitors and inductors.

15. The active power filter system according to claim 11, wherein each group of filter assembly of said multiple inverter comprises notch filter including capacitors and inductors, damping filter including capacitors and resistors, wherein said notch filter and said damping filter are connected in parallel.

16. The active power filter system according to claim 11, wherein the drive signals of the switching devices of each of the inverter units of said at least two inverter units have a certain angle difference with each other.

17. The active power filter system according to claim 11, wherein said at least two inverter units are two-level inverter units.

18. The active power filter system according to claim 11, wherein said at least two inverter units are three-level inverter units.

19. The active power filter system according to claim 11, wherein said three-level inverter unit is a three-level flying capacitor inverter unit or a three-level neutral point clamped inverter unit.

* * * * *